US007733058B2

(12) United States Patent
Takaoka et al.

(10) Patent No.: US 7,733,058 B2
(45) Date of Patent: Jun. 8, 2010

(54) ENGAGING STRUCTURE OF ELECTRIC SHAVER AND ELECTRIC CHARGER THEREOF

(75) Inventors: Yoichi Takaoka, Konan (JP); Masayuki Sagawa, Hikone (JP); Fumio Taniguchi, Hikone (JP); Atsuhiro Saito, Hirakata (JP)

(73) Assignee: Matsushikta Electric Works, Ltd., Osaka (JP)

( * ) Notice: Subject to any disclaimer, the term of this patent is extended or adjusted under 35 U.S.C. 154(b) by 310 days.

(21) Appl. No.: 11/822,761

(22) Filed: Jul. 10, 2007

(65) Prior Publication Data

US 2008/0012528 A1 Jan. 17, 2008

(30) Foreign Application Priority Data

Jul. 14, 2006 (JP) ............................ 2006-193760

(51) Int. Cl.
*H02J 7/00* (2006.01)

(52) U.S. Cl. ...................................... 320/115; 320/114

(58) Field of Classification Search ................ 320/108, 320/114, 115
See application file for complete search history.

(56) References Cited

U.S. PATENT DOCUMENTS 5,711,328 A 1/1998 Braun
5,909,100 A 6/1999 Watanabe et al.
6,044,281 A * 3/2000 Shirai ......................... 455/573
6,112,414 A * 9/2000 Andis et al. ................... 30/231
7,026,789 B2 * 4/2006 Bozzone et al. ............. 320/108
7,588,039 B2 * 9/2009 Saito et al. .................. 134/201
2004/0029405 A1 2/2004 Neidlein
2004/0257037 A1 * 12/2004 Hartung et al. ............. 320/114
2005/0189003 A1 9/2005 Saito et al.
2006/0011225 A1 1/2006 Saito et al.
2009/0314317 A1 12/2009 Saito et al.

FOREIGN PATENT DOCUMENTS

| | | |
|---|---|---|
| DE | 44 02 238 | 7/1995 |
| EP | 1 609 384 | 12/2005 |
| JP | 7-51472 | 2/1995 |
| JP | 9-180814 | 7/1997 |
| JP | 10-112354 | 4/1998 |
| JP | 2000-324220 | 11/2000 |
| JP | 2004-516614 | 6/2004 |
| JP | 2004-261208 | 9/2004 |
| JP | 2005-237701 | 9/2005 |
| WO | 2004/073941 | 9/2004 |
| WO | 2004/089152 | 10/2004 |

* cited by examiner

*Primary Examiner*—Patrick J Assouad
*Assistant Examiner*—Samuel Berhanu
(74) *Attorney, Agent, or Firm*—Bacon & Thomas, PLLC

(57) ABSTRACT

An engaging structure of an electric shaver and an electric charger is provided wherein the electric charger at least serving to charge the electric shaver is mounted thereat. The engaging structure includes a magnet provided at one of the electric shaver or the electric charger; and an attracting member provided at the other thereof, the attracting member being made of a material magnetically attracted to the magnet. Further, a contact portions for electrically connecting the electric shaver and the electric charger are provided between a weight center of the electric shaver and the magnet disposed above the contact point at an opposite side of a mounting direction of the electric shaver.

9 Claims, 6 Drawing Sheets

ENGAGING STRUCTURE OF ELECTRIC SHAVER AND ELECTRIC CHARGER THEREOF

FIELD OF THE INVENTION

The present invention relates to an engaging structure of an electric shaver and an electric charger thereof; and, more particularly, to a structure for preventing a loose contact in contact portion for electrically connecting an electric shaver and an electric charger thereof and realizing a stable mounting of the electric shaver.

BACKGROUND OF THE INVENTION

In a typical engaging (mounting) structure of an electric shaver and a cleaning/charging apparatus having a cleaning function that is configured to clean a blade unit of the electric shaver, the electric shaver has at its upper portion the blade unit and at its lower portion charging pins which electrically connects the electric shaver with the cleaning/charging apparatus. The electric shaver is placed upside down on the cleaning/charging apparatus so that a shaving head of the electric shaver is mounted faced down. The shaving head is positioned in a cleaning part of the cleaning/charging apparatus, and the charging pins are made to contact with a contact portion (terminals) provided at the cleaning/charging apparatus so as to charge the electric shaver by supplying power therethrough.

However, in case of mounting the electric shaver, which has the charging pins at the lower portion thereof, on the cleaning/charging apparatus, the charging pins are positioned uppermost. Therefore, in order to secure a stable contact with the charging pins of the electric shaver, the height of the cleaning/charging apparatus needs to be greater than that of the electric shaver.

In order to solve the problem, a structure is proposed which disposes charging pins on the rear surface of the electric shaver (hair removing apparatus), which allows the height of the cleaning/charging apparatus to be lower (see, e.g., Japanese Patent Laid-open Application No. 2004-261208; hereinafter, referred to as “Reference 1”). Reference 1 discloses therein techniques for preventing a loose contact between terminals by ensuring a rigid contact therebetween, one of which is a mechanically engaging mechanism to engage the electric shaver and the cleaning/charging apparatus by pulling the electric shaver with a movable support arm provided at the cleaning/charging apparatus; and the other is an electromagnetically inductive engaging mechanism to engage the electric shaver and the cleaning/charging apparatus by generating an electromagnetic induction from coils provided at the electric shaver and the cleaning/charging apparatus.

Moreover, although it is not an engaging structure designed specifically for an electric shaver and a cleaning/charging apparatus, there is an engaging structure of a portable radio telephone and a desktop holding stage for supplying power to the portable radio telephone, wherein the portable radio telephone has a magnet and the desktop holding stage has a weight made of a material that is capable of being attracted to the magnet (see, e.g., Japanese Patent Laid-open Application No. 2000-324220; hereinafter, referred to as “Reference 2”).

In addition, there has been proposed a technique for fixing a terminal of a charging device. Although it is not an engaging structure designed specifically for an electric shaver and a cleaning/charging apparatus, in the technique, an elastic part of the terminal is supported by a support member disposed away from a fixed end of the terminal and a pressure applied from a to-be-charged device mounted on the charging device to the contact portion of the terminal is received by a deflection of a portion from the contact portion to the support member supporting the elastic part, to thereby prevent the pressure applied to the contact portion from reaching a vicinity of the fixed end (see, e.g., Japanese Patent Laid-open Application No. 2003-132958; hereinafter, referred to as “Reference 3”).

However, the techniques disclosed in References 1 to 3 provide an unsatisfactory electrical connection state between the electric shaver charging device and the to-be-charged device and, accordingly, the contact mechanism between terminals needs to be further improved to provide a better connectivity.

SUMMARY OF THE INVENTION

It is, therefore, an object of the present invention to provide an engaging structure capable of engaging an electric shaver and an electric charger with a simple configuration while preventing a loose contact between contact portions thereof and ensuring a stable contact pressure while precisely positioning an electric shaver onto an electric charger.

In accordance with an embodiment of the present invention, there is provided an engaging structure of an electric shaver and an electric charger, the electric charger at least serving to charge the electric shaver mounted thereat, including a magnet provided at one of the electric shaver or the electric charger; and an attracting member provided at the other thereof, the attracting member being made of a material magnetically attracted to the magnet, wherein a contact portions for electrically connecting the electric shaver and the electric charger are provided between a weight center of the electric shaver and the magnet disposed above the contact point at an opposite side of a mounting direction of the electric shaver.

Therefore, the mounting of the electric shaver in the electric charger thereof becomes stable. Accordingly, it is possible to prevent a loose contact in a contact point between the electric shaver and the electric charger thereof with a simple configuration and also possible to ensure a stable contact pressure.

It may be preferable that a central position of the attracting member is deviated, with respect to a central position of the magnet, in a direction allowing the electric shaver to be attached along the mounting direction in the electric charger.

Thus, the electric shaver can be strongly attracted to the electric charger thereof due to a horizontal attractive force as well as a magnetic force in a magnetizing direction of the magnet. As a consequence, the electric shaver and the electric charger thereof can be precisely positioned and, also, the stability of the mounting of the electric shaver can be improved.

It may be preferable that, among the contact portions, a contact portion of a contact metal strip provided at the electric charger has a hemispherical shape.

Therefore, the contact point of the electric shaver can contact with the contact metal strips in every direction without being stuck to or by the terminal pin 6.

It may be preferable that the engaging structure of an electric shaver and an electric charger further includes a multi-point bender for varying a reaction force acting at the contact portions in two or more steps.

Accordingly, it is possible to obtain a reaction force at contact in which the attractive force of the magnet decreases as the distance increases.

It may be preferable that the engaging structure of an electric shaver and an electric charger further includes a detector unit provided separately from the contact metal strip provided at the electric charger, the detector unit detecting the electric shaver when the electric shaver is mounted in the electric charger.

Accordingly, when a metal piece attracted to the magnet is mistakenly inserted into the electric charger, it is possible to prevent the cleaning operation from taking place.

BRIEF DESCRIPTION OF THE DRAWINGS

The above and other objects and features of the present invention will become apparent from the following description of embodiment, given in conjunction with the accompanying drawings, in which.

DETAILED DESCRIPTION OF THE EMBODIMENT

Hereinafter, a specific embodiment of the present invention will be described in detail with reference to the accompanying drawings. In this embodiment, the present invention is applied to an engaging (mounting) structure of an electric shaver and a cleaning/charging apparatus having a cleaning function for cleaning a blade unit of the electric shaver and a charging function for charging the electric shaver.

Figure 1:
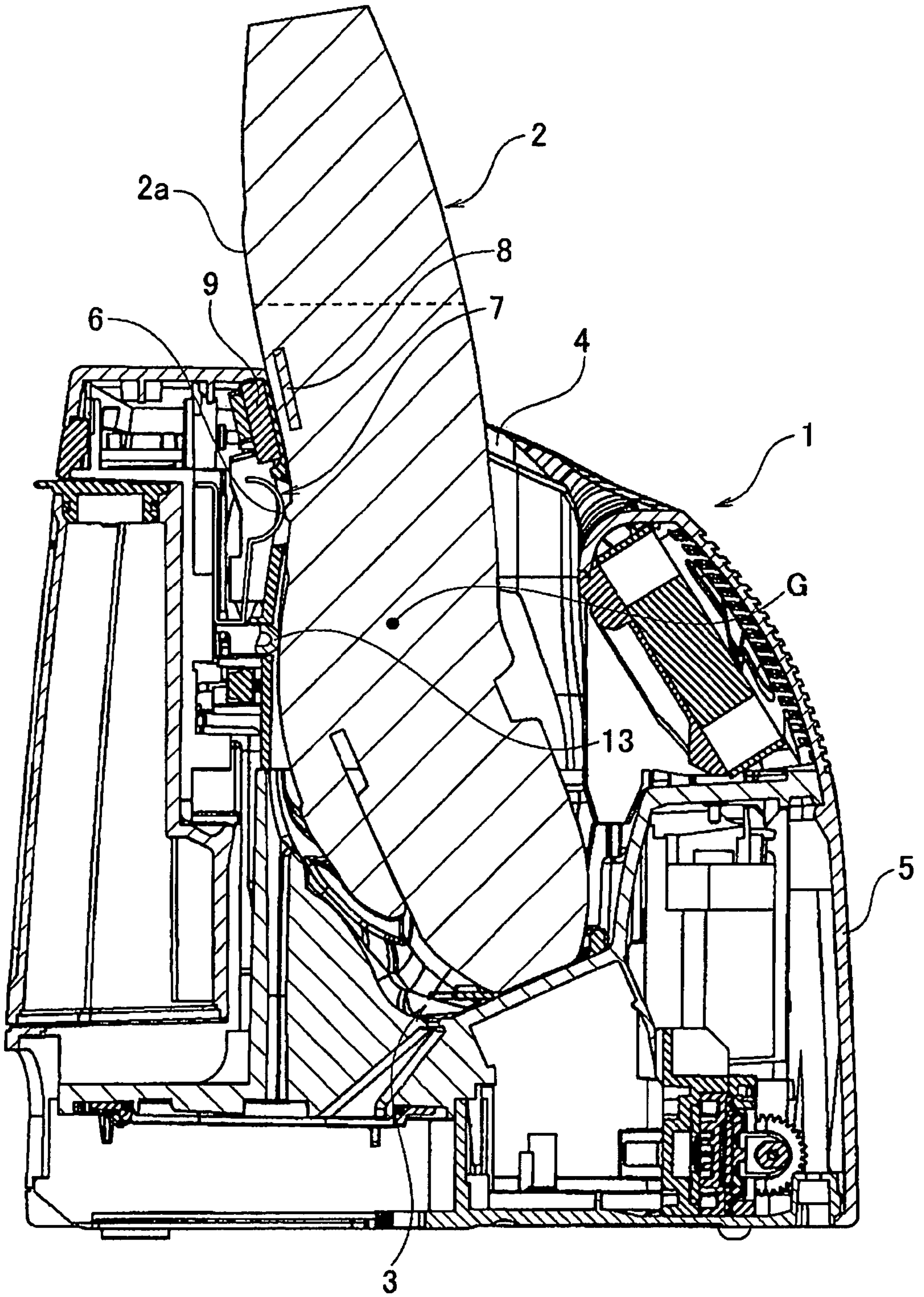
FIG. 1 is a cross sectional view showing a rechargeable electric shaver capable of being charged by being mounted on a cleaning/charging apparatus.
Figure 2:
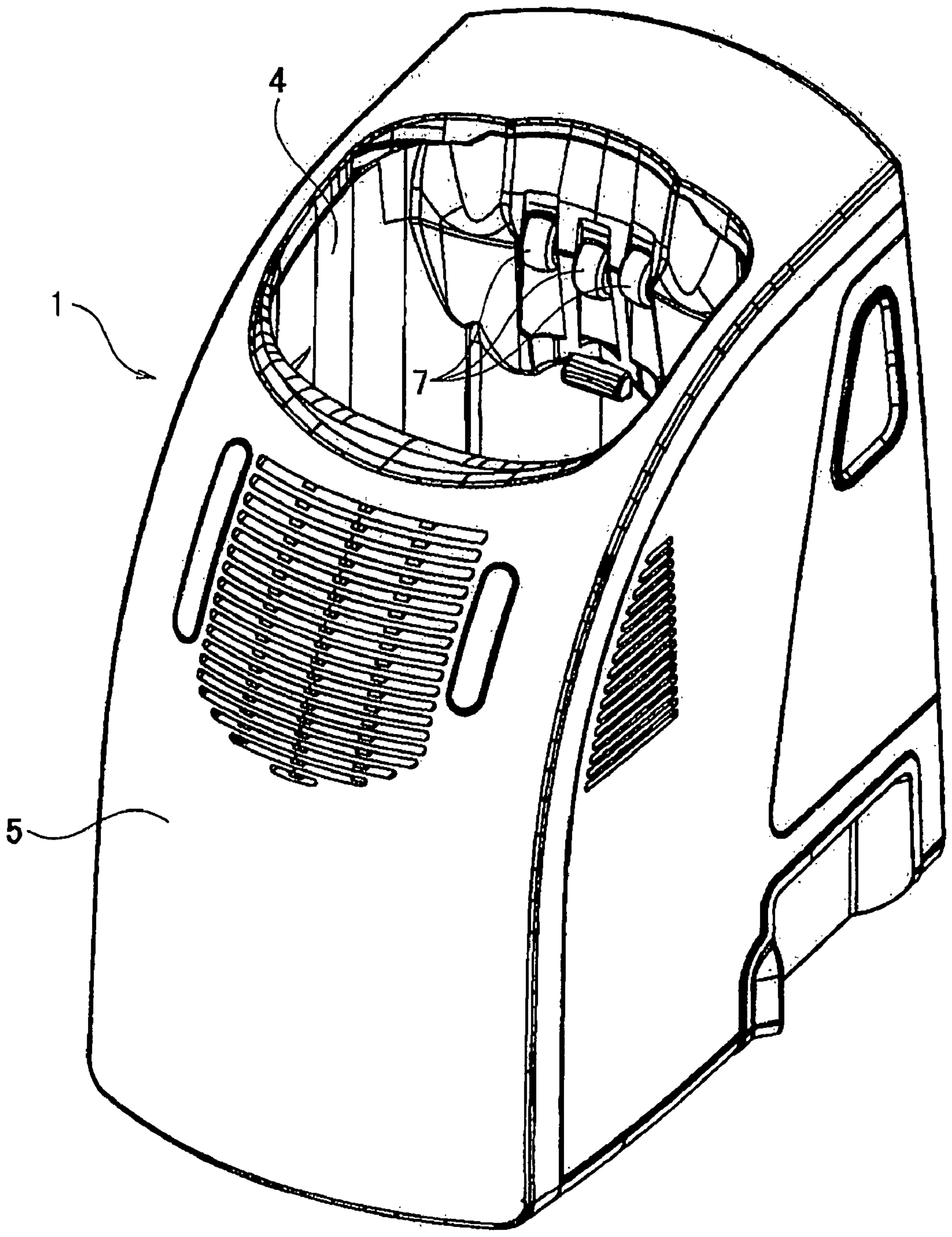
FIG. 2 describes a perspective view of the cleaning/charging apparatus.
Figure 3:
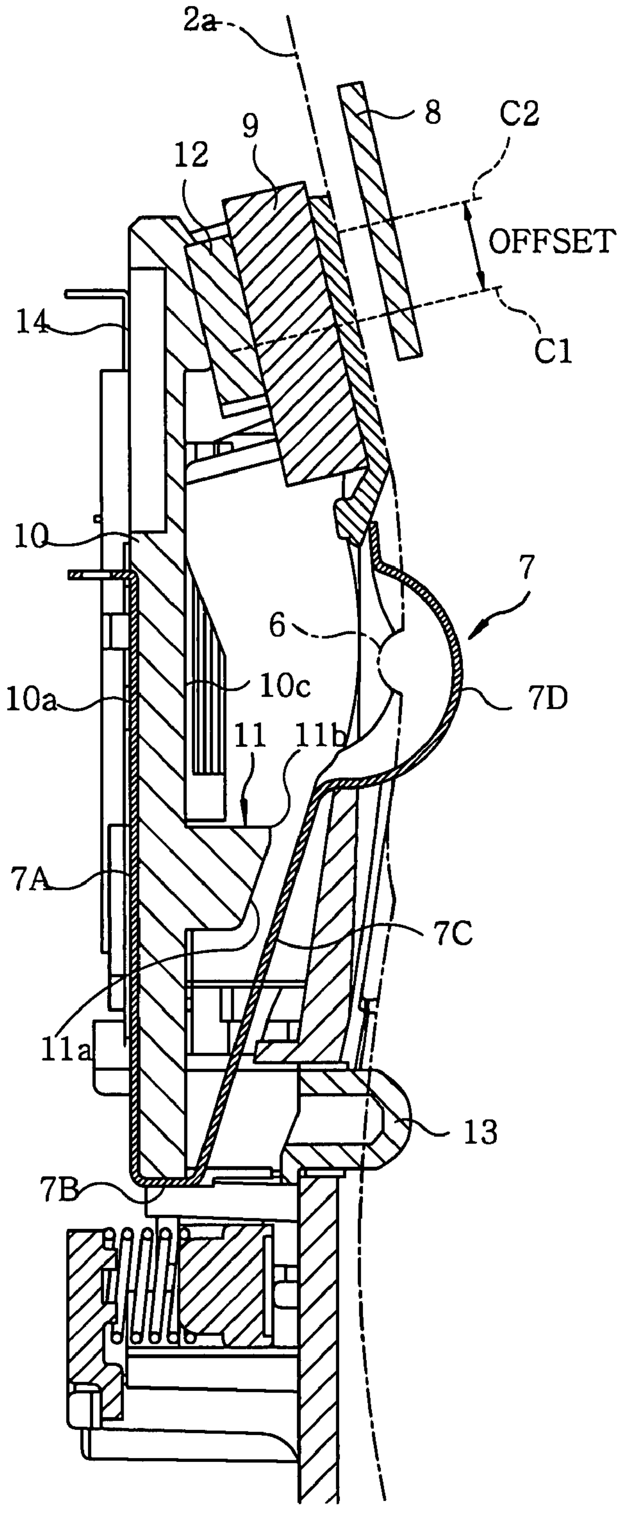
FIG. 3 provides an enlarged cross sectional view of principal parts illustrating contact portions between the electric shaver and the cleaning/charging apparatus.
Figure 4:
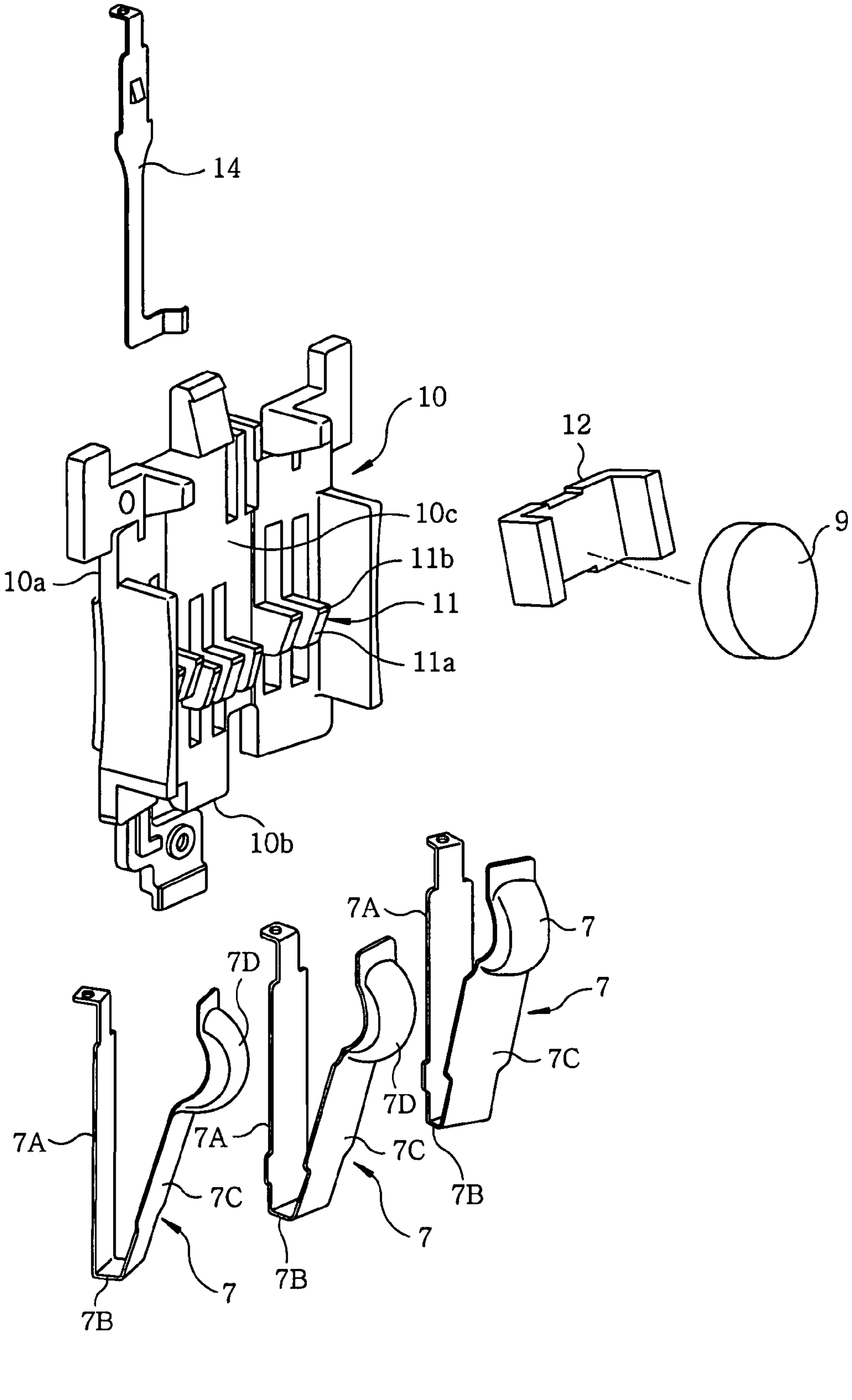
FIG. 4 presents an exploded perspective view depicting a magnet provided at the cleaning/charging apparatus, contact metal strips of the contact portions and components for the contact metal strips.

As shown in FIGS. 1 and 2, a cleaning/charging apparatus 1 includes a cleaning/charging apparatus main body 5 having a shaver insertion opening 4 which is for accommodating an electric shaver 2 to mount the same to a cleaning part 3 in a position where a blade unit of the shaver 2 faces downward. As illustrated in FIGS. 3 and 4, the cleaning/charging apparatus main body 5 has contact metal strips 7 that are electrically connected to terminal pins 6 provided on a rear surface 2*a* of the electric shaver 2; and a magnet 9 for attracting a metal plate 8 provided inside the rear surface of the electric shaver 2. In this embodiment, there are provided three terminal pins 6 and three contact metal strips 7.

Each of the contact metal strips 7 includes an attachment fixture 7A mounted at a strip mounting base 10, a horizontal portion 7B horizontally extended from a bottom portion of the attachment fixture 7A, a bending portion 7C elongated obliquely upward from a leading end of the horizontal portion 7B, and a contact portion 7D provided at a leading end of the bending portion 7C so as to contact with the terminal pin 6. The overall shape of the contact metal strips 7 is roughly a V shape as can be seen from FIG. 3.

The attachment fixture 7A is attached to a rear surface 10*a* of the strip mounting base 10. The horizontal portion 7B contacts with a bottom surface 10*b* of the strip mounting base 10. The bending portion 7C is disposed at a front surface 10*c* of the strip mounting base 10 and can be bent freely as it moves toward or away from the strip mounting base 10. The contact point 7D has a hemispheric shape so that it can easily come in contact with the terminal pin 6 in every direction without being stuck to or by the terminal pin 6.

Since the strip mounting base 10 serves as a base to which the contact metal strips 7 is attached, it is made of an insulating material to avoid a short-circuit. Provided on the front surface 10*c* of the strip mounting base 10 is a multi-bending provider 11 which allows the reaction force acting against the terminal pin 6 by the contact point 7D of the contact metal strips 7 to vary in multiple steps. That is, the changing rate of the reaction force with respect to a displacement of the contact potion 7D varies due to the presence of the multi-bending provider 11. The multi-bending provider 11 is formed as a protrusion having an inclined surface 11*a* that comes in surface contact with the bending portion 7C. When the terminal pin 6 is made press the contact point 7D, the bending portion 7C is bent and comes in contact with the inclined surface 11*a*. If the contact metal strips 7 are further pressed, the bending portion 7C is bent by pivoting about a leading end portion 11*b* of the protrusion, allowing a greater reaction force to be exerted by the contact portion 7D.

Figure 5A:
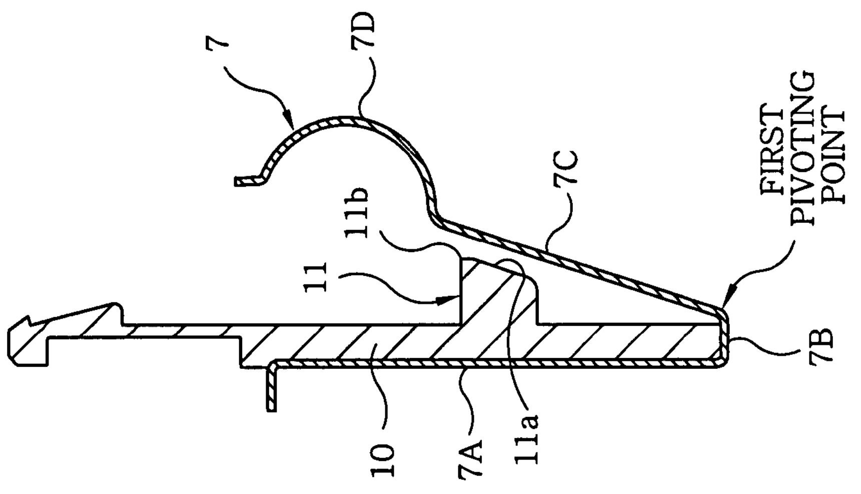
FIGS. 5A to 5C represent bending of an contact metal strips.
Figure 5B:
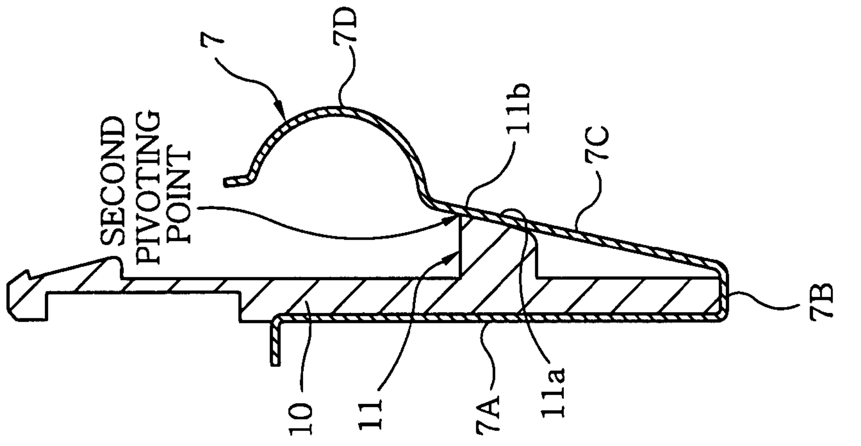
Figure 5C:
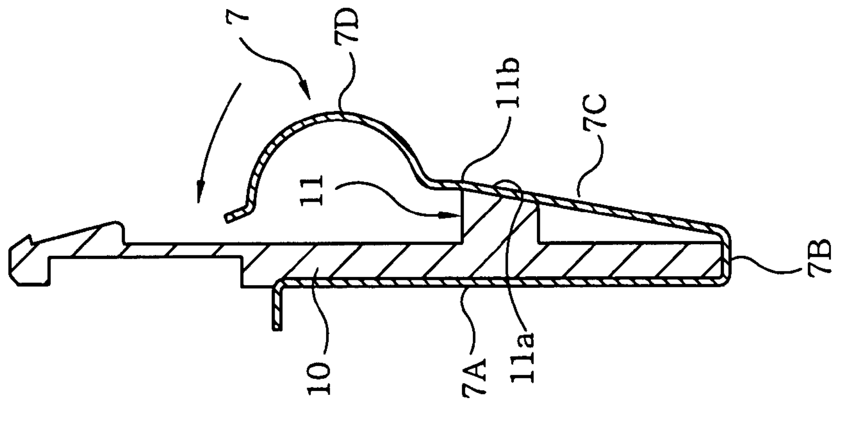

As depicted in FIGS. 5A to 5C, the reaction force of the contact point 7D of the contact metal strips 7 varies in multiple steps (two steps in this example). To be specific, at an initial stage in which the bending portion 7C is yet to be made in contact with the inclined surface 11*a* of the electric contact strip mounting base 10, the contact portion 7D is disposed by pivoting about a bent portion (first pivoting point) between the horizontal portion 7B and the bending portion 7C, as can be seen from FIG. 5A. The reaction force of the contact portion 7D acting on the terminal pin 6 in this step is defined as a first reaction force. After the bending portion 7C contacts with the inclined surface 11*a* of the electric contact strip mounting base 10 as illustrated in FIG. 5B, the contact point 7D is disposed by being pivoted about the leading end portion 11*b* of the strip mounting base 10 (second pivoting point), as can be seen from FIG. 5C. By reducing a distance between the second pivoting point and an operating point (contact point between the terminal pin 6 and the contact portion 7D), a greater reaction force (second reaction force) can be obtained.

Figure 6:
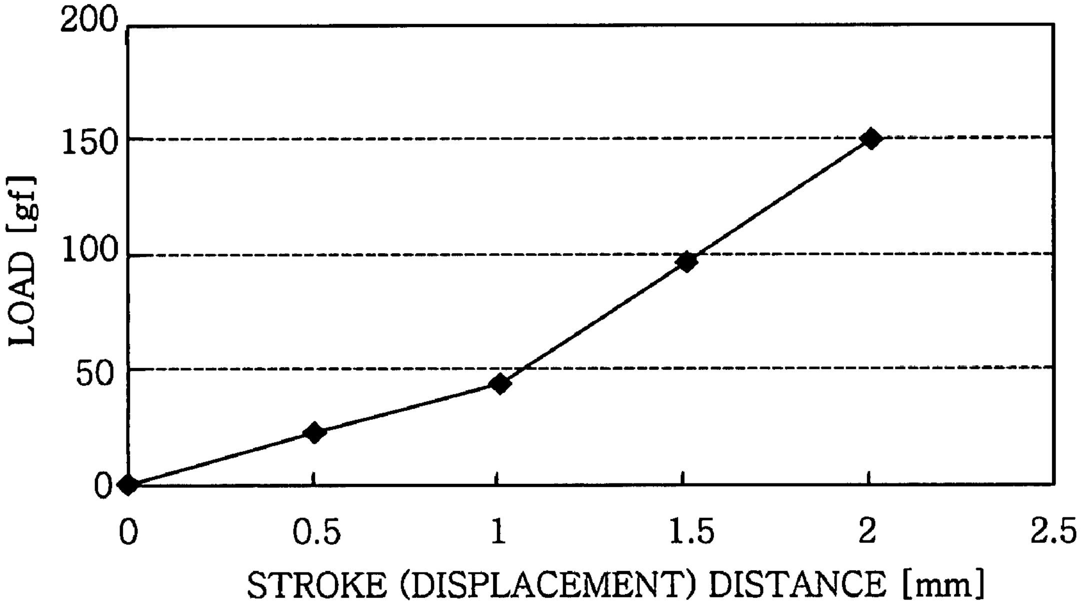
FIG. 6 offers a characteristic diagram demonstrating a relationship between the amount of stroke and a load when the reaction force of the contact metal strips is changed in multiple stages.

FIG. 6 provides a graph explaining the above, wherein the horizontal axis represents the amount of stroke (displacement) and the vertical axis represents load. As can be seen from FIG. 6, the reaction force (load) at the contact portion 7D can be varied in multiple steps by making the contact metal strips 7 to contact with the multi-bending provider 11 at a certain displacement. In this embodiment, a single multi-point bender 11 is provided to serve as the pivoting point to vary the reaction force in two steps. However, two or more multi-point benders 11 can be provided to vary the reaction force in three or more steps.

The magnet 9 is positioned above and near the contact portion 7D of the contact metal strips 7. Further, the magnet 9 is attached to a yoke 12 which is for boosting the magnetic force, the yoke 12 having a substantially one side-opened rectangular shape when seen from the top. Moreover, the magnet 9 is disposed, together with the yoke 12, in the cleaning/charging apparatus main body 5. In this embodiment, a weight center G of the electric shaver 2, the contact portion 7D and the magnet 9 are disposed as described below.

That is, the contact portion of the terminal pin 6 and the contact portion 7D of the contact metal strips 7 for electrically connecting the electric shaver 2 and the cleaning/charging apparatus main body 5 are provided between the weight center G of the electric shaver 2 and the magnet 9 disposed above the contact portion 7D at an opposite side of the mounting direction of the electric shaver 2. When the magnet 9, the contact point 7D and the weight center G of the electric shaver 2 are arranged in the above-described configuration, the electric shaver 2 can be mounted in the cleaning/charging apparatus 1 in a most stable manner. That is, even if the magnet 9 has a low magnetic force, the presence of the magnet 9 disposed above the contact portion 7D provides more force to attach the electric shaver 2 toward the cleaning/charging apparatus 1. This increased force allows in turn a stable mounting state of the electric shaver 2 in the cleaning/charging apparatus 1.

Meanwhile, the metal plate 8 configured to magnetically attract to the magnet 9 is provided at a part in the electric shaver 2 so as to face the magnet 9. The metal plate 8 and the magnet 9 are arranged so that a central position C2 of the metal plate 8 with respect to a central position C1 of the magnet 9 is deviated in a direction allowing the electric shaver 2 to be attracted along the mounting direction in the cleaning/charging apparatus 1. Specifically, the metal plate 8 is positioned not right in front of but slightly above the electric shaver 2.

By shifting the central position C2 of the metal plate 8 with respect to the central position C1 of the magnet 9 opposite to the mounting direction, not only a vertical magnetic force but also an attractive magnetic force in a surface direction parallel to a magnet surface is applied therebetween. The electric shaver 2 is inserted by itself into the cleaning part 3 when mounting the electric shaver 2 in the cleaning/charging apparatus 1 as if the electric shaver 2 is being pulled into the cleaning/charging apparatus 1.

Moreover, the cleaning/charging apparatus 1 includes a detector unit for detecting the mounting status of the electric shaver 2 in the cleaning/charging apparatus 1. The detector unit has a shaver detection switch 13, which is switched on by being pressed by the electric shaver 2 when the electric shaver 2 is mounted at the cleaning/charging apparatus 1; and a shaver detection member 14 for providing the detection signal when the shaver detection switch 13 is pressed.

By providing the shaver detection switch 13 serving to detect the electric shaver 2 and the electric contact metal strips 7 separately, erroneous detection of the electric shaver 2 can be avoided which can otherwise take place when the contact metal strips 7 are configured to function as the shaver detection switch as well For example, even when a metal piece or the like attracted to the magnet 9 is mistakenly gotten into the cleaning/charging apparatus 1, the cleaning operation is prevented from being initiated as long as the shaver detecting switch 13 is pressed.

In order to mount the electric shaver 2 to the cleaning/charging apparatus 1 configured in a manner described above, the electric shaver 2 is dropped through the shaver insertion opening 4 of the cleaning/charging apparatus 1 with its blade unit placed upside down. Due to a self-weight of the electric shaver 2, the electric shaver 2 is then slipped into the cleaning part of the cleaning/charging apparatus 1. While the electric shaver 2 is slipped therethrough, the metal plate 8 provided at the electric shaver 2 is attracted to the magnet 9 provided at the cleaning/charging apparatus 1 and, therefore, the electric shaver is automatically attracted in the desired mounting direction. As a result, the blade unit is mounted to the cleaning part 3.

While the invention has been shown and described with respect to the embodiment, it will be understood by those skilled in the art that various changes and modification may be made without departing from the scope of the invention as defined in the following claims.

What is claimed is:

1. An engaging structure of an electric shaver and an electric charger, the electric charger at least serving to charge the electric shaver mounted thereat, comprising:

a magnet provided at one of the electric shaver or and the electric charger; and an attracting member provided at the other of the electric shaver and the electric charger, the attracting member being made of a material magnetically attracted to the magnet, wherein contact portions for electrically connecting the electric shaver and the electric charger are provided between a weight center of the electric shaver and the magnet disposed above the contact portions at an opposite side of a mounting direction of the electric shaver.

2. The engaging structure of an electric shaver and an electric charger of claim 1, wherein the magnet is provided at the electric charger and a central position of the attracting member is deviated, slightly above a central position of the magnet, in a direction allowing the electric shaver to be attached along the mounting direction in the electric charger.

3. The engaging structure of an electric shaver and an electric charger of claim 1, wherein among the contact portions, a contact portion of a contact metal strip provided at the electric charger has a hemispherical shape.

4. The engaging structure of an electric shaver and an electric charger of claim 1, further comprising a multi-point bender for varying a reaction force acting at the contact portions in two or more steps.

5. The engaging structure of an electric shaver and an electric charger of claim 3, further comprising a detector unit provided separately from the contact metal strip provided at the electric charger, the detector unit detecting the electric shaver when the electric shaver is mounted in the electric charger.

6. The engaging structure of an electric shaver and an electric charger of claim 1, wherein the magnet is provided at the electric shaver and a central position of the attracting member is deviated with respect to a central position of the magnet, in a direction allowing the electric shaver to be attached along the mounting direction in the electric charger.

7. The engaging structure of an electric shaver and an electric charger of claim 5, wherein the detector unit has a shaver detection switch that is switched on by being pressed by the electric shaver when the electric shaver is mounted in the electric charger.

8. The engaging structure of an electric shaver and an electric charger of claim 6, wherein the magnet is provided at the electric shaver and a central position of the attracting member is deviated slightly above a central position of the magnet, in a direction allowing the electric shaver to be attached along the mounting direction in the electric charger.

9. The engaging structure of an electric shaver and an electric charger of claim 6, wherein the magnet is provided at the electric shaver and a central position of the attracting member is deviated slightly below a central position of the magnet, in a direction allowing the electric shaver to be attached along the mounting direction in the electric charger.

* * * * *